June 30, 1959    C. F. CARTER ET AL    2,892,778
LOW TEMPERATURE METHOD FOR PREPARING HIGH TEMPERATURE GREASES
Filed Oct. 25, 1954    2 Sheets-Sheet 1
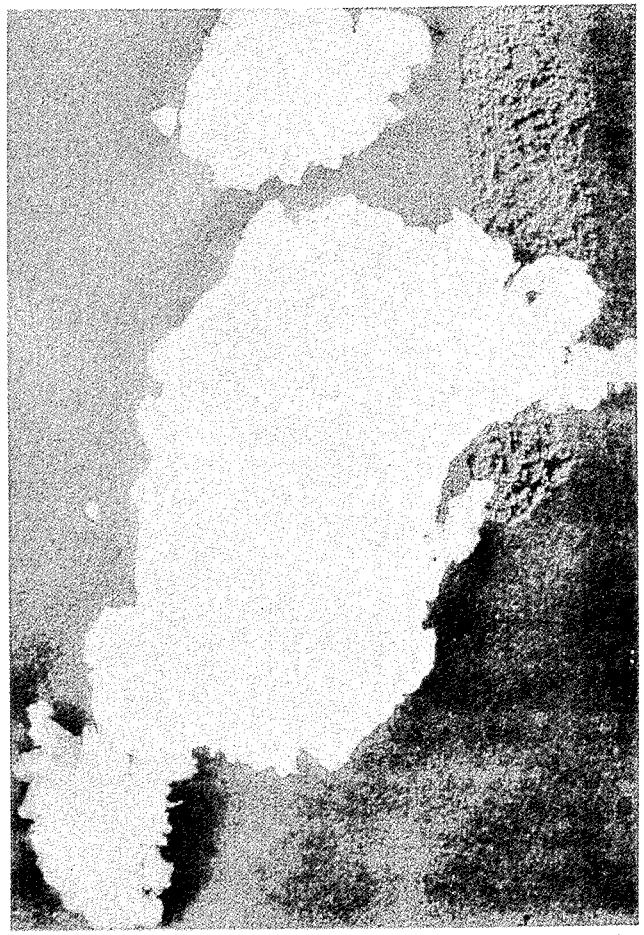
FIG. I
INVENTORS
CRAWFORD F. CARTER
JOHN L. DREHER
BY
ATTORNEY
AGENT

FIG. II

United States Patent Office 2,892,778
Patented June 30, 1959

2,892,778
LOW TEMPERATURE METHOD FOR PREPARING HIGH TEMPERATURE GREASES

Crawford F. Carter and John L. Dreher, Concord, Calif., assignors to California Research Corporation, San Francisco, Calif., a corporation of Delaware Application October 25, 1954, Serial No. 464,312

9 Claims. (Cl. 252—33.6)

This invention pertains to a new method of preparing grease compositions having high melting points; that is, high dropping points.

High melting point lubricants are now essential for the proper lubrication of automotive wheel bearings, steel mill equipment, high speed motors, universal joints, airplane motors, jet engines, guided missiles, etc. In recent years there has been a continuing trend to manufacture machines having higher speeds and having greater loads on bearings and gears. Because of the greater speeds and increased loads, such machines function at higher temperatures than heretofore, requiring the use of higher temperature lubricating compositions for proper lubrication. Military and industrial grease specifications describe greases having dropping points of 400° F. as a minimum.

Prior methods of preparing greases have shown that the components of the grease-thickening agents (for example, fatty acids and metal hydroxides) can be added to the oil, and the resulting composition heated to high temperatures, forming the metal soap-thickening agent in situ, after which the composition is cooled to form a grease structure. On the other hand, the metal soap grease thickeners per se can be incorporated directly in the base oils, and the oil compositions heated to the high solubilizing temperatures, after which the composition is cooled to form the grease structure. Following the formation of the grease structure by either of these prior processes, the greases can be passed through colloid mills to modify the physical properties thereof, such as the dropping point, etc.

In the preparation of high temperature greases (i.e., greases having high dropping points) by these prior processes, the grease-thickening agents and the base oils must be heated to temperatures at which the thickening agents become solubilized in the base oil; and, in the case of high melting point greases, the temperature may be in the range of 600° F. and higher.

When such high temperatures become essential in the formation of greases, various other problems arise. For example, the high temperatures cause oxidation of the grease base oil, a discoloration of the greases, and other deleterious results. The high temperatures make it necessary to use special heating equipment to obtain the greater amounts of energy which are required. Also, special oils are needed for conducting the heat from a central heating system, and these oils must be changed frequently because of their degradation at high temperatures. Furthermore, it becomes necessary to have special equipment to cool the compositions from such high temperatures down to ambient temperatures.

It is a primary object of this invention to prepare grease compositions by a method which overcomes the objections noted hereinabove.

In accordance with the invention set forth herein, high melting point grease compositions are prepared by forming an admixture comprising a base oil having dispersed therein a grease-thickening agent acid, a basic substance, and a solvent for said basic substance, and by placing said admixture in a zone of shearing force sufficient essentially simultaneously to form a soap of said grease-thickening agent acid, and to stably disperse said soap in said oil to form a grease structure.

In the process of the present invention, the grease thickener acid is first solubilized (or dispersed) in the base oil, after which the metal base and the solvent for the metal base are mixed into the base oil-acid blend at temperatures ranging from 100° F. to 140° F., preferably at room temperatures, and no more than about 200° F. The resulting admixture is then heated, with agitation, to a temperature as high as 250° F., preferably no higher than 220° F., for the primary purpose of forming a uniform blend. During this heating, metal base solvent may incidentally be removed from the lubricating oil composition. The admixture is then cooled to a temperature below 200° F., preferably below 175° F.

The mixture is then subjected to a shearing force sufficient to cause a reaction between the acid and the base substance to form a soap, and essentially simultaneously to disperse the soap thus formed in the oil to form a grease structure. The shearing forces are sufficient to form a soap of the acid of the thickening agent and substantially simultaneously to stably disperse said soap in the oil to form a stable gel structure and thicken the oil to the consistency of a grease. Generally, shearing forces sufficient for the foregoing purpose have shearing rates having values in the range of 500 to $1 \times 10^{10}$ reciprocal seconds; preferably from $1 \times 10^4$ to $1 \times 10^7$ reciprocal seconds.

The shearing forces of the process of the present invention can be obtained by the use of the Manton-Gaulin Homogenizer, the Eppenbach Colloid Mill, the Cornell Homogenizer, high-speed gear pumps, and other equipment which can impart the necessary shear rates to compositions exemplified hereinabove.

Although it is preferred that the ingredients are blended together carefully until a uniform blend is obtained, a homogeneous mixture prior to the action of the shearing forces is not essential.

By the grease manufacturing process described herein, greases having dropping points in excess of 500° F. can be prepared by heating the components of grease compositions to temperatures no greater than about 200° F. The temperature is below that sufficient for substantial saponification of the grease thickening agent acid. For example, a grease having a melting point of about 600+° F. can be prepared by heating a base oil and soap-forming components to temperatures no higher than approximately 200° F. Such large temperature differentials are of considerable advantage in saving energy, permitting the use of less expensive equipment, forming light-colored high-temperature greases, allowing greases to be prepared in a much shorter space of time than heretofore possible, etc.

As used herein, the term "grease-thickening agent acid" means an organic acid from which the metal soap grease-thickening agent is formed; that is, an organic acid the metal soap of which thickens lubricating oils to the consistency of a grease.

As used herein, the term "high melting point" refers to greases having melting points greater than 300° F.

Grease-thickening agents which form high melting point greases include the metal soaps of terephthalic acid, terephthalamic acid, isophthalamic acid, amic acids, and other soap-forming acids capable of forming high melting point greases.

Various terephthalamates which form high melting point grease compositions are exemplified in Hotten patent application Serial No. 401,697, filed December 31, 1953

(now abandoned). Terephthalamic acids disclosed therein include those of the formula:

I.
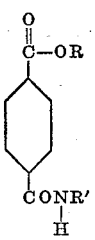

wherein R represents hydrogen or a hydrocarbon radical and R' represents a hydrocarbon radical.

Examples of terephthalamic acids and derivatives which can be used in the process of this invention for the preparation of high melting point greases include N-decyl terephthalamic acid; N-dodecyl terephthalamic acid; N-tetradecyl terephthalamic acid; N-hexadecyl terephthalamic acid; N-octadecyl terephthalamic acid; N-eicosyl terephthalamic acid; N-docosyl terephthalamic acid; methyl,N-decyl terephthalamate; ethyl,N-decyl terephthalamate; propyl,N-decyl terephthalamate; butyl,N-decyl terephthalamate; pentyl,N-decyl terephthalamate; hexyl, N-decyl terephthalamate; heptyl,N-decyl terephthalamate; octyl,N-decyl terephthalamate; decyl,N-decyl terephthalamate; ethyl,N-octyl terephthalamate; ethyl,N-dodecyl terephthalamate; ethyl,N-tetradecyl terephthalamate; ethyl,N-hexadecyl terephthalamate; ethyl,N-octadecyl terephthalamate; ethyl,N-eiscosyl terephthalamate, etc.

Similarly, the following isophthalamic acids, terephthalic acids, and their derivatives can be used in the process of this invention to form high melting point greases: N-decyl isophthalamic acid, N-dodecyl isophthalamic acid, N-tetradecyl isophthalamic acid, N-hexadecyl isophthalamic acid, N-octadecyl isophthalamic acid, N-eicosyl isophthalamic acid, N-docosyl isophthalamic acid, monodecyl terephthalate, monododecyl terephthalate, monotetradecyl terephthalate, monohexadecyl terephthalate, monooctadecyl terephthalate, monoeicosyl terephthalate, monodocosyl terephthalate, etc.

Polyamic acid salts are also used in the preparation of high melting point greases. Thus, polyamic acids which can be used according to the process of this invention include those described in Dixon U.S. Patent No. 2,752,312, filed August 19, 1952. These are formulated as follows:

II.
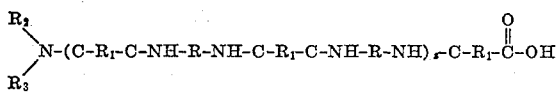

wherein R, $R_1$ and $R_2$ are hydrocarbon radicals, $R_3$ is hydrogen or a hydrocarbon radical, and $z$ represents a number for the recurring groups.

The process of this invention is particularly well adapted to the preparation of high melting point greases such as those which are obtained by the use of the acids set forth hereinabove. However, other acids which can be used in this process include fatty acids, the metal soaps of which thicken lubricating oils, such as oleic acid, stearic acid, hydroxystearic acid, etc.

Grease-thickening soaps are formed in the process herein by the reaction of the above-noted acids with basic substances, that is, oxides and hydroxides of the metals of groups I, II, III, and IV of Mendeleeff's Periodic Table, Particular metals include the metals of groups I and II of Mendeleeff's Periodic Table, such as lithium, sodium, potassium, calcium, barium, strontium, magnesium, zinc, and cadmium, and including aluminum and lead.

The basic substances are used in amount sufficient to substantially neutralize the grease-thickening agent acid in the formation of grease-thickening soaps.

For the purpose of obtaining uniform distribution of the basic substances in the lubricating oils, the basic substances are dissolved (or dispersed) in solvents such as water, methyl alcohol, ethyl alcohol, etc. Although it is desirable to use solvents which can be readily distilled from the lubricating oil composition, a solvent may be used which becomes part of the grease composition (e.g., glycerol).

Lubricating oils which are suitable base oils for grease compositions prepared according to the process of this invention include a wide variety of lubricating oils, such as naphthenic base, paraffin base, and mixed base, other hydrocarbon lubricants, e.g., lubricating oils derived from coal products, and synthetic oils, e.g., alkylene polymers (such as polymers of propylene, butylene, etc., and mixtures thereof), alkylene oxide type polymers, dicarboxylic acid esters, liquid esters of acids of phosphorus, alkyl benzene polymers, polymers of silicon, etc. Synthetic oils of the alkylene oxide type polymers which may be used include those which may be exemplified by the alkylene oxide polymers (e.g., propylene oxide polymers), and derivatives, including alkylene oxide polymers prepared by polymerizing the alkylene oxides, e.g., propylene oxide, in the presence of water or alcohols, e.g., ethyl alcohol; esters of ethylene oxide type polymers, e.g., acetylated propylene oxide polymers prepared by acetylating propylene oxide polymers containing hydroxyl groups; polyethers prepared from alkylene glycols, e.g., ethylene glycols, etc.

The polymeric products prepared from the various alkylene oxides and alkylene glycols may be polyoxyalkylene diols or polyalkylene glycol derivatives; that is, the terminal hydroxy group can remain as such, or one or both of the terminal hydroxy groups can be removed during the polymerization reaction by esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dibasic (dicarboxylic) acid ester synthetic oils include dibutyl adipate, dihexyl adipate, di-2-ethylhexyl sebacate, di-N-hexyl fumaric polymer. Synthetic oils of the alkyl benzene type include those which are prepared by alkylating benzene (e.g., dodecyl benzene, tetradecyl benzene, etc.).

Synthetic oils of the type of polymers of silicon include the liquid esters of silicon and the polysiloxanes. The liquid esters of silicon and the polysiloxanes include those exemplified by tetraethyl silicate, tetraisopropyl silicate, tetra(methyl-2-butyl) silicate, tetra(4-methyl-2-penta) silicate, tetra(1-methoxy-2-propyl) silicate, disiloxane, poly(methyl) siloxane, poly(methylphenyl) siloxane, and poly(phenoxyglycols), etc.

With certain of the synthetic oils (e.g., the polysiloxanes) the gel-transfer method has been necessary as a means of forming a grease structure for the preparation of grease compositions. However, by the process herein, greases can be made directly from synthetic oils without any gel-transfer process.

The following examples illustrate the preparation of grease compositions from a mixture of the base oil, the acid from which the soap grease thickening agent is formed, a basic substance, and a solvent for the basic substance, according to the present invention.

Example 1 illustrates the preparation of a monoester of a terephthalamic acid, the soaps of which are used as grease-thickening agents.

*Example 1.—Preparation of the methyl ester of N-"octadecyl" terephthalamate*

A mixture of 45 pounds of dimethyl terephthalate and 255 pounds of benzene was heated to 130° F. until all of the dimethyl terephthalate was dissolved, after which a solution of 12.3 pounds of potassium hydroxide in 58.5 pounds of absolute alcohol was added. The heating was continued at 130° F. for an additional 50 minutes.

It is to be particularly noted that in this reaction only one methyl group is saponified, and when this saponification has been completed, the salt precipitates from the benzene-alcohol mixture.

10 gallons of water were added to the above mixture to dissolve the potassium salt of monomethyl terephthalate thus formed. The aqueous layer of the salt was separated, and to this aqueous layer was added 3.5 liters of concentrated sulfuric acid at room temperature to form the free acid having the formula:

This acid was filtered, washed with water, and dried in vacuo. After purification, the neutralization equivalent of the acid thus formed was 180, which is equal to the theoretical neutralization equivalent.

28 pounds of the acid were dispersed in 37 pounds of benzene and heated to about 185° F., after which 20.5 pounds of thionyl chloride were added over a period of 2 hours at 185° F. After the complete addition of the thionyl chloride, the mixture was refluxed for 4 hours. The excess thionyl chloride and benzene were then removed by distillation. The product obtained at this point has the formula:

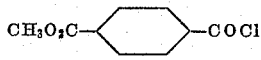

A mixture of 25 pounds of this acid chloride, 9.5 pounds of triethylamine and 26.6 pounds of "octadecyl" amine was heated at about 160° F. until the amine had substantially wholly dispersed, after which the mixture was heated at 180° F. for 15 minutes.

To the above mixture was added 15 gallons of water at 195° F., after which the mixture was filtered.

The "octadecyl" terephthalamic acid ester thus prepared was washed three times with hot water and dried. The saponification equivalent of the final product was 471 (the average of four determinations).

The "octadecyl" amine used herein was a commercial preparation of amines known as "Armeen HT," sold by the Armour Company, and containing 25% hexadecylamine, 70% octadecylamine, and 5% octadecenylamine. 85% of this mixture consists of N-primary amines.

*Example 2—Preparation of a grease thickened with barium N-"octadecyl" terephthalamates*

A mixture of 250 grams of the methyl ester of N-"octadecyl" terephthalamate of Example 1, 97.5 grams of a barium hydroxide monohydrate, and 2152.5 grams of a California solvent refined paraffin base oil having a viscosity of 480 at 100° F., was blended together by heating to a maximum temperature of 220° F. This mixture was then passed through a Manton-Gaulin colloid mill at the rate of 3 pounds per minute at a pressure of 4000 p.s.i.g. The temperature of the mix as it went into the mill was 130° F., and the temperature of the grease coming out of the mill was 170° F. The resulting grease composition had a work penetration of 335 after 60 strokes in an ASTM worker, and the dropping point was 478° F.

*Example 3—Preparation of a grease thickened with barium N-"octadecyl" terephthalamates*

A mixture of 250 grams of the methyl ester of N-"octadecyl" terephthalamate of Example 1, 97.5 grams of barium hydroxide monohydrate in 1500 grams of water and 2152.5 grams of a California solvent refined paraffin base oil having a viscosity of 480 at 100° F. was slowly heated to a maximum temperature of 300° F., after which the mixture was cooled to 130° F. The cooled mixture was introduced into a Manton-Gaulin colloid mill at the rate of 3 pounds per minute at a pressure of 4000 p.s.i.g. The temperature of the mixture as it went into the mill was 130° F., and the temperature of the resulting grease coming out of the mill was 180° F. The grease composition had a work penetration of 321 after 60 strokes on the ASTM worker, and the ASTM dropping point was 500+ °F.

*Example 4—Preparation of a grease thickened with calcium N-"Octadecyl" terephthalamates*

A mixture of 250 grams of the methyl ester of N-"Octadecyl" terephthalamate of Example 1, 22.5 grams of calcium hydroxide in 25 grams of water, and 2227.5 grams of a California solvent refined paraffin base oil having a viscosity of 480 at 100° F. was slowly heated to a temperature of 200° F., then cooled to a temperature of 130° F. At this latter temperature, the mixture was passed through a Manton-Gaulin colloid mill at a rate of 3 pounds per minute at a pressure of 4000 p.s.i.g. The temperature of the thickened composition as it came from the colloid mill was 170° F.

*Example 5—Preparation of a grease thickened with lithium N-"Octadecyl" terephthalamates*

A mixture of 250 grams of the methyl ester of N-"Octadecyl" terephthalamate of Example 1, 25.9 grams of lithium hydroxide monohydrate in 30 grams of water, and 2224.1 grams of a California solvent refined paraffin base oil having a viscosity of 480 SSU at 100° F. was slowly heated to a temperature of 220° F. with rapid stirring, then heated to 300° F. for dehydration. The mixture was then cooled to 130° F. and passed through a Manton-Gaulin colloid mill at the rate of 3 pounds per minute at a pressure of 4000 p.s.i.g. The temperature of the grease composition coming out of the colloid mill was 185° F. The grease composition had a penetration value of 264 after 60 strokes in the ASTM worker, and the ASTM dropping point was 430° F.

*Example 6—Preparation of lithium hydroxy-stearate thickened grease*

A mixture of 250 grams of hydroxy-stearic acid, 41.5 grams of lithium monohydrate in 250 grams of water, and 2208.5 grams of a California solvent-refined paraffin base oil having a viscosity of 480 at 100° F. was heated to a temperature of 180° F. with continuous stirring. The temperature of the mixture was then lowered to 125° F., after which the mixture was charged to a Manton-Gaulin colloid mill at the rate of 3 pounds per minute at a pressure of 4000 p.s.i.g. The temperature of the grease composition as it came from the mill was 180° F. The grease composition had a worked penetration of 380 after 60 strokes in the ASTM worker, and a dropping point of 303° F.

In the several examples noted above, it is readily seen that the temperatures at which the grease compositions were formed were considerably lower than those which were necessary when a grease-thickening agent is solubilized in an oil via the usual methods of heating and dissolution. For example, the grease composition of Example 6 was formed in a very short period of time at a maximum temperature of 180° F. However, no grease would have resulted therefrom if, for example, the hydroxy-stearic acid, lithium hydroxide octahydrate, and oil had been merely heated at 180° F. for such a short period of time without further treatment. It would have been necessary to heat the composition for a number of hours (i.e., approximately 10 hours at that temperature) to obtain the same grease structure in the base oil which was here obtained in a matter of only a few minutes.

The temperatures to which the ingredients of the grease composition are originally heated before they are subjected to a shearing force is that temperature which results in minimum degree of saponification of the soap-forming organic acid; that is, a temperature below that sufficient for substantial saponification of the soap-forming organic acid; a temperature at which less than a major proportion of soap formation can take place.

Table I hereinbelow presents data showing that a grease structure is not obtained during the initial heating of the grease components prior to the milling step. These data were obtained by heating a mixture consisting of methyl,N-"Octadecyl" terephthalamate, an aqueous slurry of sodium hydroxide and a California solvent-refined base oil having a viscosity of 480 SSU at 100° F. in the grease-forming proportions of the above examples at the temperature noted. The grease-thickening agent was present in an amount of 10%, by weight. The worked and unworked penetration values (at 77° F.) and the dropping point were determined. (The worked penetration was obtained after 60 strokes in the ASTM worker.)

TABLE I

| Sample number | Temp. to which sample had been heated before milling, °F. | Unmilled | | | Milled [1] | | |
|---|---|---|---|---|---|---|---|
| | | Dropping Point, °F. | $P_0$ | $P_{60}$ | Dropping Point, °F. | $P_0$ | $P_{60}$ |
| 1 | 100 | 100 | 430+ | 430+ | | | |
| 2 | 125 | 100 | 430+ | 430+ | 500+ | | 340 |
| 3 | 150 | 100 | 430+ | 430+ | 500+ | 189 | 280 |
| 4 | 175 | 164 | 351 | 430+ | 500+ | 174 | 265 |
| 5 | 220 | 190 | | 430+ | 500+ | | |
| 6 | 250 | 183 | | 430+ | 500+ | | |
| 7 | 300 | 206 | | 430+ | 500+ | | 265 |
| 8 [2] | | 180 | | | | | |

[1] The samples were passed through a Manton-Gaulin mill at a rate of 3 pounds per minute at a pressure of 4000 p.s.i.g.
[2] This sample consisted only of the base oil and the grease-thickening agent acid, not the soap.

The electron-photomicrograph of Figure I herein illustrates the appearance of a grease-forming composition after it had been heated, and before it was passed through a colloid mill. The picture shows that a grease structure had not been obtained. This particular electron-photomicrograph was obtained of a mixture of 330 grams of methyl,N-"Octadecyl" terephthalamate, 30 grams of sodium hydroxide in 30 grams of water, and 2640 grams of a California solvent-refined, paraffin base oil having a viscosity of 480 SSU at 100° F. which was heated to 160° F. for a period of approximately 30 minutes.

The electron-photomicrograph (Figure II herein illustrates the appearance of the grease structure after the above mixture had passed through a Manton-Gaulin colloid mill at the rate of 450 grams per minute. The resulting grease had a worked penetration of 296 after 60 strokes in the ASTM worker.

We claim:

1. A process of preparing a high melting point grease composition comprising forming a blend consisting essentially of a lubricating oil, a monoester of terephthalamic acid in an amount such that the soap thereof thickens said lubricating oil to the consistency of a grease, a basic substance selected from the group consisting of alkali metal and alkaline earth metal oxides and hydroxides, and a solvent for said basic substance, heating said blend to a maximum of 220° F. temperature, subjecting said blend to a shearing force sufficient to form a soap of said monoester of terephthalamic acid and essentially simultaneously to stably disperse said soap of terephthalamic acid in said oil to thicken said oil to the consistency of a grease, said solvent being selected from the group consisting of alcohol and water, and wherein said basic substance is present in an amount sufficient to substantially neutralize said monoester of terephthalamic acid.

2. A process of preparing a high melting grease composition comprising blending a mixture consisting essentially of a lubricating oil, from 5% to 50%, by weight, of a monoester of terephthalamic acid, a solution of a basic substance in an amount sufficient to substantially neutralize said terephthalamic acid, heating said blended mixture to a maximum temperature of 250° F., then placing said blend in a zone of shearing, wherein the shearing rate has values in the range of $1 \times 10^4$ to $1 \times 10^7$ reciprocal seconds for a time sufficient essentially simultaneously to form a soap of said monoester of terephthalamic acid and to disperse said soap in said oil and thicken said oil to the consistency of a grease, wherein said basic substance is selected from the group consisting of the alkali metal and alkaline earth metal oxides and hydroxides, and wherein the solvent for said basic substance is selected from the group consisting of alcohol and water and is present in amounts sufficient to dissolve said basic substance.

3. A process of preparing a high melting grease composition comprising blending a mixture consisting essentially of a lubricating oil, from 5% to 50%, by weight, of a monoester of terephthalamic acid, a solution of a basic substance in an amount sufficient to substantially neutralize said terephthalamic acid, heating said blended mixture to a temperature no more than 250° F., after which said mixture is placed in a zone of shearing force, wherein the shearing rate has values in the range of $1 \times 10^4$ to $1 \times 10^7$ reciprocal seconds, for a time sufficient essentially simultaneously to form a soap of said monoester of terephthalamic acid and disperse said soap in said oil to thicken said oil to the consistency of a grease, wherein said basic substance is selected from the group consisting of the alkali metal and alkaline earth metal oxides and hydroxides, and wherein the solvent for said basic substance is selected from the group consisting of alcohol and water.

4. The process of claim 3, wherein said basic substance is selected from the group consisting of the alkali metal oxides and hydroxides.

5. The process of claim 3, wherein said basic substance is selected from the group consisting of the alkaline earth metal oxides and hydroxides.

6. A process of preparing a high melting grease composition comprising forming a mixture consisting essentially of a lubricating oil, from 7% to 30%, by weight, of a monoester of terephthalamic acid, a solution of a basic substance in an amount sufficient to substantially neutralize said terephthalamic acid, heating said mixture to a temperature no greater than 250° F., after which said mixture is placed in a zone of shearing wherein the shearing rate has values in the range of $1 \times 10^4$ to $1 \times 10^7$ reciprocal seconds for a time sufficient essentially simultaneously to form a soap of said monoester of terephthalamic acid and disperse said soap in said oil to thicken said oil to the consistency of a grease, wherein said basic substance is selected from the group consisting of the alkali metal and alkaline earth metal oxides and hydroxides, and wherein the solvent for said basic substance is selected from the group consisting of alcohol and water.

7. A process of preparing a high melting grease composition comprising blending a mixture consisting essentially of a lubricating oil, from 7% to 30%, by weight, of a monoester of terephthalamic acid, a solution of basic substance in an amount sufficient to substantially neutralize said terephthalamic acid, heating said mixture to a maximum temperature of 220° F., after which said mixture is placed in a zone of shearing force wherein the shearing rate has values in the range of $1\times10^4$ to $1\times10^7$ reciprocal seconds for a time sufficient essentially simultaneously to form a soap of said monoester of terephthalamic acid and disperse said soap in said oil to thicken said oil to the consistency of a grease, wherein said basic substance is selected from the group consisting of the alkali metal and alkaline earth metal oxides and hydroxides, and wherein the solvent for said basic substance is selected from the group consisting of alcohol and water, and wherein said monoester of terephthalamic acid has an ester radical containing from 10 to 22 carbon atoms.

8. A process of preparing a high melting grease composition comprising blending a mixture consisting essentially of a lubricating oil, from 7% to 30%, by weight, of monoester of N-dodecyl terephthalamic acid, a solution of a basic substance in an amount sufficient to substantially neutralize said terephthalamate, heating said mixture to a maximum temperature of 220° F., which is then placed in a zone of shearing force wherein the shearing rate has values in the range of $1\times10^4$ to $1\times10^7$ reciprocal seconds for a time sufficient to essentially simultaneously form a soap of said monoester of N-dodecyl terephthalamic acid and disperse said soap in said oil and thicken said oil to the consistency of a grease, wherein said basic substance is selected from the group consisting of the alkali metal and alkaline earth metal oxides and hydroxides, and wherein the solvent for said basic substance is selected from the group consisting of alcohol and water.

9. A process of preparing a high melting grease composition comprising blending a mixture consisting essentially of a petroleum lubricating oil, from 7% to 30% by weight of ethyl, N-dodecyl terephthalamate, a solution of a basic substance in an amount sufficient to substantially neutralize said terephthalamate, heating said mixture to a maximum temperature of 220° F., immediately placing said admixture in a zone of shearing force wherein the shearing rate has values in the range of $1\times10^4$ to $1\times10^7$ reciprocal seconds for a time sufficient to essentially simultaneously form a soap of N-dodecyl terephthalamic acid and dispersing said soap in said oil to thicken said oil to the consistency of a grease, wherein said basic substance is an alkali metal hydroxide, and wherein the solvent for said basic substance is selected from the group consisting of alcohol and water.

References Cited in the file of this patent

UNITED STATES PATENTS

| | | |
|---|---|---|
| 1,722,687 | Spensley | July 30, 1929 |
| 2,383,906 | Zimmer et al. | Aug. 28, 1945 |
| 2,652,366 | Jones et al. | Sept. 15, 1953 |
| 2,704,363 | Armstrong | Mar. 15, 1955 |
| 2,752,312 | Dixon | June 26, 1956 |
| 2,820,012 | Hotten | Jan. 14, 1958 |

OTHER REFERENCES

The Manufacture and Application of Lubricating Greases, Boner, Reinhold Pub. Corp., N. Y., 1954, page 271.